United States Patent [19]

Sasaki et al.

[11] Patent Number: 5,145,932
[45] Date of Patent: Sep. 8, 1992

[54] ORGANOPOLYSILOXANE COMPOSITION FOR THE FORMATION OF A RELEASE FILM

[75] Inventors: Shosaku Sasaki, Chiba; Hiroshi Masaoka, Saitama, both of Japan

[73] Assignee: Toray Silicone Company, Ltd., Tokyo, Japan

[21] Appl. No.: 439,913

[22] Filed: Nov. 21, 1989

[30] Foreign Application Priority Data

Nov. 25, 1988 [JP] Japan .................. 63-299302

[51] Int. Cl.$^5$ .............................. C08G 77/04
[52] U.S. Cl. ...................... 528/15; 528/31; 528/32; 524/267; 524/731
[58] Field of Search ............... 528/15, 32, 31; 524/267, 731

[56] References Cited

U.S. PATENT DOCUMENTS

| | | | |
|---|---|---|---|
| 4,340,647 | 7/1982 | Eckberg | 528/32 |
| 4,356,116 | 10/1982 | Beers | 524/731 |
| 4,419,484 | 12/1983 | Sattlegger et al. | 524/731 |
| 4,677,161 | 6/1987 | Suzuki et al. | 524/731 |
| 4,774,297 | 9/1988 | Murakami et al. | 528/32 |
| 4,783,552 | 11/1988 | Lo et al. | 525/478 |
| 4,943,601 | 7/1990 | Dinallo, Sr. | 524/731 |
| 4,985,525 | 1/1991 | Clark et al. | 528/31 |
| 5,036,117 | 7/1991 | Chung et al. | 528/15 |
| 5,064,916 | 11/1991 | Sasaki et al. | 525/478 |

*Primary Examiner*—Melvyn I. Marquis
*Assistant Examiner*—Margaret W. Glass
*Attorney, Agent, or Firm*—George A. Grindahl

[57] ABSTRACT

A curable organopolysiloxane composition comprising an organopolysiloxane having higher alkenyl groups, an organohydrogenpolysiloxane crosslinker, and organopolysiloxane free of alkenyl groups and silicon-bonded hydrogen atoms, a platinum group metal-containing catalyst and an inhibitor therefor provides for the formation of a cured release film. When this composition is coated on the surface of any of various types of substrates, for example, paper, synthetic resin films, fibers, etc., and then heated for 10 to 20 seconds at 80 to 90 degrees Centigrade, it forms a cured film which manifests an extremely good release performance for tacky substances, such as, for example, pressure-sensitive adhesives, and the like, while at the same time evidencing an excellent adherence to the substrate itself. The compositions can be used with synthetic resin films, such as polyolefin, which are easily deformed by heat and with poorly heat-tolerant paper.

9 Claims, No Drawings

ORGANOPOLYSILOXANE COMPOSITION FOR THE FORMATION OF A RELEASE FILM

BACKGROUND OF THE INVENTION

The present invention relates to an organopolysiloxane composition for the formation of a release film, and, more particularly, relates to such a composition which evidences a rapid curing rate at low temperatures (not exceeding 100 degrees Centigrade) and which develops an extremely good release performance against tacky substances.

It is well known that such properties as water repellency, slickness, releaseability from tacky substances, and the like, can be generated by forming a cured film from an organopolysiloxane composition on the surface of various substrates, for example, various types of paper, laminated paper, synthetic films, knitted or woven fabrics, metal foils, etc. For example, Japanese Patent Publication Number 52-40918 discloses an organopolysiloxane composition comprising vinyl-containing organopolysiloxane, organohydrogenpolysiloxane, and platinum-type compound, while Japanese Patent Application Laid Open (Kokai) Number 62-86061 (86,061/87) discloses an organopolysiloxane composition comprising platinum-type compound, organohydrogenpolysiloxane, and low-viscosity organopolysiloxane possessing higher alkenyl groups such as the hexenyl group.

However, the former organopolysiloxane composition has a slow curing rate, and, in order to induce its curing in a short period of time, it becomes necessary to implement a high-temperature heat treatment on the level of at least 140 degrees Centigrade. This causes such problems as heat shrinkage and blistering in the substrate as well as a decline in gloss by mirror-finished surfaces. In the case of the latter organopolysiloxane composition, while the curing rate is in fact rapid, this composition is not entirely satisfactory in its applications due to a somewhat inferior release performance.

BRIEF SUMMARY OF THE INVENTION

The present inventors achieved the present invention as a consequence of investigations directed at solving the aforementioned problems.

The present invention takes as its object the introduction of a release film-forming organopolysiloxane composition which, prior to curing, evidences an excellent standing or storage stability, which cures rapidly, and which, upon curing, affords a cured film having a particularly good release performance.

This object, and others which will become apparent to one of ordinary skill in the organosilicone art, is obtained by the compositions of the present invention which, briefly stated, comprises an organopolysiloxane bearing at least two higher alkenyl groups, an organohydrogenpolysiloxane crosslinker therefor, a platinum group metal-containing compound, an inhibitor therefor and an organopolysiloxane which does not contain silicon-bonded alkenyl groups or silicon-bonded hydrogen atoms.

DETAILED DESCRIPTION OF THE INVENTION

The present invention relates to an organopolysiloxane composition for the formation of a cured release film, said composition comprising (A) 100 weight parts organopolysiloxane which contains in each molecule at least two alkenyl groups as represented by the general formula $H_2C=CH(CH_2-)_a$ wherein the subscript a has a value of from 2 to 8, (B) 0.3 to 40 weight parts organohydrogenpolysiloxane having
at least two silicon-bonded hydrogen atoms in each molecule, (C) 4 to 100 weight parts organopolysiloxane whose molecule
does not contain silicon-bonded alkenyl groups or silicon-bonded hydrogen atoms, (D) addition-reaction inhibitor in an effective amount, and (E) a platinum group metal-containing compound in a catalytic quantity.

To explain the preceding in greater detail, the organopolysiloxane constituting the component (A) used by the present invention is the major, i.e. principal, component of the composition of the present invention, and comprises an organopolysiloxane having in each molecule at least two higher alkenyl groups as represented by the general formula $H_2C=CH(CH_2-)_a$. The value of a in this formula is to be 2 through 8, and the range of 3 through 8 is preferred. When a falls below 2, the rate of cured-film formation is slow. It becomes difficult or impossible to prepare this organopolysiloxane at values beyond 8.

With regard to this organopolysiloxane's degree of polymerization (DP), compounds can be used which range from low DPs corresponding to 100 centipoise at 25 degrees Centigrade to the high DPs corresponding to gums.

However, organopolysiloxane gums are preferred when the composition of the present invention will be used in applications requiring strength performance by the release film, for example, tensile strength, elongation, tear strength, abrasion resistance, etc.

Such organopolysiloxane gums will generally have the same plasticity and fluidity as the organopolysiloxane gums used as base components for silicone rubbers. An organopolysiloxane gum is a slowly to non-flowing material having a viscosity of at least 10, centipoise at 25° C. For polydimethylsiloxane gums this viscosity value corresponds to a plasticity number of approximately 75. A plasticity of at least 100 as stipulated in JIS C 2123 is generally preferred.

To measure the plasticity of unvulcanized silicone rubber JIS C 2123 requires that a spherical (diameter approximately 1.56 cm) or a cylindrical (diameter approximately 1.43 cm height approximately 1.27 cm) test specimen having a volume of $2+/-0.02$ cm$^3$ be prepared, using a pair of dies, from test material which has been maintained at a known temperature of $25+/-5°$ C. for 5 hours. The test specimen is lightly dusted with talc, placed between two sheets of cellophane, maintained at a known temperature of $25+/-5°$ C. for $15+/-0.5$ minutes and then the test specimen with cellophane sheets is placed between the gap of two parallel plates of a Williams Plastometer which has been previously set to a gage reading of zero with two sheets of cellophane in the gap. The test specimen is subjected to a force of 49+/−0.049 newtons for 5 minutes, after which the thickness of the test specimen is read from the plastometer gage to the nearest 1/100 mm and this reading is multiplied by 100 to provide a plasticity number. The average of three plasticity numbers, along with the temperature at which the plasticity numbers were measured, is reported as the plasticity number for the unvulcanized silicone rubber. JIS C 2123 is substantially identical to ASTM 926-67, when a test temperature of at 23° C. and a test interval of 15 minutes is used. ASTM 926-67 is incorporated herein by reference to teach how to measure the plasticity of component (A).

This organopolysiloxane (A) is exemplified by organopolysiloxane as represented by the following average unit formula $R_b SiO_{(4-b)/2}$ and also having in each molecule at least two higher alkenyl groups as represented by the following general formula $H_2C=CH(CH_2-)_a$.

The group R in this formula comprises substituted and unsubstituted monovalent hydrocarbon groups as exemplified by alkyl groups such as methyl, ethyl, propyl, and butyl; higher alkenyl groups as represented by the following general formula $H_2C=CH(CH_2-)_a$, wherein a =2 to 8; aryl groups such as phenyl, tolyl, and xylyl; aralkyl groups such as 2-phenylethyl and 2-phenylpropyl; and halogenated alkyl groups, such as 3,3,3-trifluoropropyl. It is preferred that methyl comprise at least 70 mole% of R from the standpoint of the obtained release properties. Furthermore, the subscript b has a value of from 1.9 to 2.05. Finally, the organopolysiloxane under consideration may contain small quantities of the hydroxyl group or alkoxy groups.

The instant organopolysiloxane component is concretely exemplified by triorganosiloxy-terminated dimethylsiloxane polymers such as dimethylbutenylsiloxy-terminated dimethylpolysiloxanes, dimethylpentenylsiloxy-terminated dimethylpolysiloxanes, dimethylhexenylsiloxy-terminated dimethylpolysiloxanes, dimethylheptenylsiloxy-terminated dimethylpolysiloxanes, dimethyloctenylsiloxy-terminated dimethylpolysiloxanes, trimethylsiloxy-terminated methylbutenylsiloxane-dimethylsiloxane copolymers, trimethylsiloxy-terminated methylpentenylsiloxane-dimethylsiloxane copolymers, trimethylsiloxy-terminated methylhexenylsiloxane-dimethylsiloxane copolymers, trimethylsiloxy-terminated methylheptenylsiloxane-dimethylsiloxane copolymers, trimethylsiloxy-terminated methyloctenylsiloxane-dimethylsiloxane copolymers, dimethylpentenylsiloxy-terminated methylphenylsiloxane-dimethylsiloxane copolymers, dimethylhexenylsiloxy-terminated methylhexenylsiloxane-dimethylsiloxane copolymers, and dimethylhexenylsiloxy-terminated diphenylsiloxane-dimethylsiloxane copolymers; and silanol-terminated dimethylsiloxane polymers such as silanol-terminated methylbutenylsiloxane-dimethylsiloxane copolymers, silanol-terminated methylhexenylsiloxane-dimethylsiloxane copolymers, and silanol-terminated methylpentenylsiloxane-dimethylsiloxane copolymers.

The organohydrogenpolysiloxane comprising the component (B) used by the present invention is a crosslinker for component (A). In order to function as a crosslinker, it is necessary that at least two silicon-bonded hydrogen atoms be present in each molecule. Such organohydrogenpolysiloxanes are exemplified as follows: dimethylhydrogensiloxy-terminated dimethylsiloxane-methylhydrogensiloxane copolymers, trimethylsiloxy-terminated dimethylsiloxane-methylhydrogensiloxane copolymers, dimethylphenylsiloxy-terminated dimethylsiloxane-methylhydrogensiloxane copolymers, trimethylsiloxy-terminated methylhydrogenpolysiloxanes, cyclic methylhydrogenpolysiloxanes, hydrogenpolysilsesquioxanes, and copolymers composed of dimethylhydrogensiloxane units and $SiO_2$, units.

This organohydrogenpolysiloxane component should be used at 0.3 to 40 weight parts per 100 weight parts component (A). A slow rate of cured-film formation is encountered at below 0.3 weight parts, while the release performance of the cured film deteriorates in excess of 40 weight parts.

The organopolysiloxane comprising the component (C) used by the present invention is indispensable for improving the release capabilities of the cured film, and its molecule must not contain silicon-bonded alkenyl groups or silicon-bonded hydrogen atoms. This organopolysiloxane is exemplified by organopolysiloxanes as represented by the following average unit formula $R^1_d SiO_{(4-d)/2}$.

The group $R^1$ in the above formula comprise substituted and unsubstituted monovalent hydrocarbon groups not containing an alkenyl moiety, and this group is exemplified as for R above for component (A), but excluding the alkenyl groups given for the latter. From the standpoint of the release performance, it is preferred that methyl comprise at least 70 mole% of this group. Furthermore, the subscript d has a value of from 1.95 to 2.05. The organopolysiloxane under consideration may also contain small quantities of the hydroxyl group or alkoxy groups.

This component may be any organopolysiloxane whose molecule lacks silicon-bonded alkenyl groups and silicon-bonded hydrogen atoms. Its molecular structure is not critical and may be any of straight chain, branched chain, or branched. Also, the viscosity is not critical, but viscosities of at least 1,000 centistokes at 25 degrees Centigrade are preferred and even gums can be used.

Concrete examples of this component are as follows: trimethylsiloxy-terminated dimethylpolysiloxanes, dimethylphenylsiloxy-terminated dimethylpolysiloxanes. dimethylphenylsiloxy-terminated dimethylsiloxane-diphenylsiloxane copolymers, silanol-terminated dimethylpolysiloxanes. methoxy-terminated dimethylpolysiloxanes. silanol-terminated dimethylsiloxane-methylphenylsiloxane copolymers, and silanol-terminated dimethylsiloxane-methyl(3 3,3-trifluoropropyl)siloxane copolymers. These may be used individually or in combinations of two or more.

This component is to be added at 4 to 100 weight parts per 100 weight parts component (A). The release performance is unsatisfactory at below 4 weight parts, while the residual adhesion drops to impractical levels in excess of 100 weight parts.

The addition-reaction inhibitor comprising the component (D) used by the present invention is required in order to impart storage or standing stability at room temperature to the composition of the present invention and can be any of the well-known inhibitors disclosed in the art relating to platinum-catalyzed silicone compositions. Examples here are alkynyl alcohols such as 3-methyl-1-butyne-3-ol, 3,5-dimethyl-1hexyne-3-ol, phenylbutynol, etc.; as well a methyl-3-pentene-1-yne, 3,5-dimethyl-3-hexene-1-yne, tetramethylvinylsiloxane cyclics, tetramethylhexenylsiloxane cyclics, benzotriazole, etc.

This inhibitor component should be added in a quantity which affords a practical pot life. Its reaction-inhibiting performance varies with its molecular structure and the quantity of addition thus cannot be rigorously specified; however, the quantity of addition as a general matter will fall within the range of 0.001 to 5 weight parts and preferably within the range of 0.03 to 4 weight parts for each 100 weight parts component (A).

The platinum group metal-containing compound comprising the component (E) used by the present invention is a catalyst for bringing about curing by the crosslinking of component (A) with component (B). Examples of this component are chloroplatinic acid, alcohol-modified chloroplatinic acid, the olefin complexes of chloroplatinic acid, chloroplatinic acid/vinylsiloxane coordination compounds, microparticulate platinum adsorbed on a carbon particle carrier, platinum black, palladium catalysts, and rhodium catalysts.

While the use quantity of this component cannot be rigorously specified because it varies with the species of catalyst, as a general matter it should fall within the interval of 30 to 600 ppm, based on the combined weight of components (A), (B), and (C)) as platinum-group metal in order to bring about a complete curing by treating the composition of the present invention for a brief period at no more than 100 degrees Centigrade.

With regard to the actual coating process on the surface of a sheet-form substrate, release film-forming organopolysiloxane composition prepared according to the present invention can be used either directly or after dilution with an organic solvent capable of dissolving the composition of the present invention.

Organic solvents in this regard are exemplified by aromatic hydrocarbons such as benzene, toluene, xylene, etc.; aliphatic hydrocarbons such as heptane, hexane, pentane, etc.; halogenated hydrocarbons such as trichloroethylene and perchloroethylene, etc.; as well as by ethyl acetate, methyl ethyl ketone, and the like.

The composition of the present invention can be readily prepared simply by mixing the aforementioned components (A) through (E) to homogeneity.

The composition of the present invention as described above, when coated on the surface of any of various types of substrates, for example, paper, synthetic resin films, fibers, etc., and then heated for 10 to 20 seconds at 80 to 90 degrees Centigrade, forms a cured film which manifests an extremely stable release performance for tacky substances (for example, pressure-sensitive adhesives, and the like) while at the same time evidencing an excellent adherence to the substrate itself. Accordingly, the composition of the present invention can be used, inter alia, with synthetic resin films which are easily deformed by heat and with poorly heat-tolerant paper. Moreover, it is also possible to extend its utilization to release substrates where the cured film must be tough and strong.

The present invention will be explained in greater detail in the following through illustrative examples, which are not to be taken as limiting the claimed invention. In the examples, parts = weight parts, and the viscosity is the value measured at 25 degrees Centigrade.

Moreover, the various measurement values referenced in the examples were determined according to the following methods.

Pot life

A 450 mL portion of the organopolysiloxane composition was placed in a 600 mL glass flask equipped with a condenser. This was allowed to stand with stirring at 25 degrees Centigrade, and the viscosity was measured at the prescribed time.

Curing index

The prescribed quantity of organopolysiloxane composition was coated on the surface of a film or sheet substrate. This was then heated in an air-circulation oven at the specified temperature, and the time until the formation of a completely cured film was determined.

Peeling resistance

The prescribed quantity of organopolysiloxane composition was coated on the surface of a film or sheet substrate. A cured film was prepared by heating in an air-circulation oven at a prescribed temperature for a prescribed period of time. Then, a solvent-based acrylic pressure-sensitive adhesive (Oribine BPS 5127 from Toyo Ink Mfg. Co., Limited), an emulsion-based acrylic pressure-sensitive adhesive (Oribine BPW-3110H from Toyo Ink Mfg. Co., Limited), or a solvent-based rubber pressure-sensitive adhesive (Oribine BPS 2411 from Toyo Ink Mfg. Co., Limited) was heated on the surface of this cured film for 2 minutes at 100 degrees Centigrade. Backing paper (basis weight =55 g/m$^2$) was adhered on this treated surface, and a measurement specimen was prepared by aging for the specified time period at 25 degrees Centigrade under a load of 20 g/cm$^2$. A test specimen was prepared by cutting this measurement specimen to a width of 5 cm. Using a tensile tester, the backing paper was peeled at 180 degrees at a peel rate of 0.3 m/minute, and the force (g) required for separation was measured.

Residual adhesion

A cured film of the organopolysiloxane composition was prepared on the surface of a substrate sheet by the same method as for the peeling resistance. Polyester tape (Nitto Electric Industrial Co., Limited, Polyester Tape 31B) was then adhered on this surface, followed by heating for 20 hours at 70 degrees Centigrade under a load of 20 g/cm$^2$, The tape was then peeled off and affixed to a stainless steel plate. The force (g) required to peel this tape at an angle of 180 degrees and a peel rate of 0.3 m/minute was measured, and the value reported is the percent referred to the force required to peel the reference (untreated) tape.

EXAMPLE 1

The following were dissolved in 1,786 parts toluene: 100 parts trimethylsiloxy-terminated dimethylsiloxane-methylhexenylsiloxane copolymer gum (hexenyl group content =2.0 mole%), 4 parts trimethylsiloxy-terminated methylhydrogenpolysiloxane (viscosity =5 centipoise, silicon-bonded hydrogen content =1.5 weight%), 10 parts silanol-terminated dimethylpolysiloxane gum, and 0.9 parts 3,5-dimethyl-3-hexene-1-yne. A release film-forming organopolysiloxane composition was then prepared by the addition of a chloroplatinic acid/divinyltetramethylsiloxane complex at 130 ppm as platinum based on the total weight of organopolysiloxane. This composition was then coated at 0.7 g/cm$^2$ on the surface of mirror-finished polyethylene-laminated kraft paper, and the curing index was measured at 690 degrees Centigrade. The peeling resistance and residual adhesion were measured on the cured film afforded by heating for 20 seconds at 90 degrees Centigrade. These results are reported in Tables 1 and 2.

For comparison, a release film-forming organopolysiloxane composition was prepared as above, but without using the dimethylpolysiloxane as above. The curing index, peeling resistance, and residual adhesion were measured on this organopolysiloxane composition as above, and these measurement results are also reported in Table 1 and 2.

TABLE 1

| Composition | Curing Index (seconds) 90 degrees C. |
|---|---|
| present invention | 15 |
| comparison example | 15 |

TABLE 2

| Composition | Peeling resistance (g) | | | | Residual adhesion (%) |
|---|---|---|---|---|---|
| | BPS 5127 | | BPW 3110H | | |
| | 1 day | 10 days | 1 day | 10 days | |
| present invention | 16 | 17 | 14 | 13 | 96 |
| comparison example | 27 | 30 | 26 | 24 | 98 |

EXAMPLE 2

The following were dissolved in 1,647 parts toluene: 100 parts silanol-terminated dimethylsiloxane-methylbutenylsiloxane copolymer gum (butenyl group content =1.8 mole%), 4 parts trimethylsiloxy-terminated methylhydrogenpolysiloxane (viscosity =20 centipoise), 20 parts trimethylsiloxy-terminated dimethylsiloxane-methylphenylsiloxane copolymer gum (phenyl group content =6 mole%), and 0.7 parts 3-methyl-1-butyne-3-ol. A release film-forming organopolysiloxane composition (sample 4) was then prepared by the addition of chloroplatinic acid/tetramethyldivinylsiloxane complex at 120 ppm as platinum referred to the total quantity of organopolysiloxane.

The following were also prepared: an organopolysiloxane composition (sample 5) in which silanol-terminated dimethylsiloxane-methylpentenylsiloxane copolymer gum (pentenyl group content =1.8 mole%) was used in place of the dimethylsiloxane-methylbutenylsiloxane copolymer gum of sample 4; an organopolysiloxane composition (sample 6) in which silanol-terminated dimethylsiloxane-methylheptenylsiloxane copolymer gum (heptenyl group content =1.8 mole%) was used in place of the dimethylsiloxane-methylbutenylsiloxane copolymer gum of sample 4; and an organopolysiloxane composition (sample 7) in which silanol-terminated dimethylsiloxane-methyloctenylsiloxane gum (octenyl group content =1.8 mole%) was used in place of the dimethylsiloxane-methylbutenylsiloxane copolymer gum of sample 4. Also, an organopolysiloxane composition was prepared as above, but using a silanol-terminated dimethylsiloxane-methylvinylsiloxane copolymer gum (vinyl group content =1.8 mole%) in place of the dimethylsiloxane-methylbutenylsiloxane copolymer gum of sample 4.

Each composition was then coated at 0.3 g/m² as solids on corona-treated polypropylene film: the curing time at 90 degrees Centigrade was measured, as were the peeling resistance and residual adhesion on cured films obtained by heating for 20 seconds at 90 degrees Centigrade. These results are reported in Table 3. There was no viscosity increase after 1 day for any of samples 4, 5, 6, or 7, and the pot life was thus excellent.

Samples 4 through 7 of the invention all evidenced a remarkably good low-temperature curability, a low peeling resistance, and a high residual adhesion.

TABLE 3

| Composition | Curing time at 90° C. (seconds) | Peeling resistance, g/5 cm. | | | | Residual adhesion (%) |
|---|---|---|---|---|---|---|
| | | BPS 5127 | | BPS 2411 | | |
| | | 1 day | 10 days | 1 day | 10 days | |
| sample 4 | 15 | 14 | 15 | 16 | 18 | 92 |
| sample 5 | 15 | 13 | 15 | 15 | 16 | 93 |
| sample 6 | 13 | 13 | 16 | 17 | 16 | 94 |
| sample 7 | 13 | 13 | 16 | 16 | 17 | 93 |
| comparison example | 72 | 51 | 188 | 59 | 143 | 51 |

EXAMPLE 3

The following were dissolved in 2,192 parts toluene: 100 parts dimethylhexenylsiloxy-terminated dimethylsiloxane-methylhexenylsiloxane-methylphenylsiloxane copolymer gum (hexenyl group content =2.1 mole%, phenyl group content =5 mole%), 20 parts trimethylsiloxy-terminated methylhydrogensiloxane-dimethylsiloxane copolymer (viscosity =90 centipoise, silicon-bonded hydrogen content =25 mole%), 40 parts silanol-terminated dimethylsiloxane-methylphenylsiloxane copolymer gum (phenyl group content =5 mole%), and 0.7 parts 3-methyl-1-butyne-3-ol. An organopolysiloxane composition (sample 8) was then prepared by the addition of alcohol-modified chloroplatinic acid at 150 ppm as platinum.

An organopolysiloxane composition (sample 9) was also prepared by changing the quantity of addition of the methylhydrogensiloxane-dimethylsiloxane copolymer in sample 8 to 30 parts.

The compositions were coated at 0.9 g/m² as solids on semiglassine paper: the curing time at 90 degrees Centigrade was measured, as were the peeling resistance and residual adhesion on the cured film obtained by heating at 90 degrees Centigrade for 20 seconds. These results are reported in Table 4.

The pot life of samples 8 and 9 was in each case excellent: almost no increase in viscosity was observed after 1 day. Furthermore, the peeling resistance was both low and little subject to time-dependent variation, while the residual adhesion was high.

TABLE 4

| Composition | Curing time at 90° C. (seconds) | Peeling resistance, g/5 cm. | | | | Residual adhesion (%) |
|---|---|---|---|---|---|---|
| | | BPS 5127 | | BPS 3110H | | |
| | | 1 day | 10 days | 1 day | 10 days | |
| sample 8 | 16 | 13 | 14 | 16 | 17 | 93 |
| sample 9 | 15 | 17 | 19 | 18 | 17 | 94 |

EXAMPLE 4

The following were blended to afford a release film-forming organopolysiloxane composition (sample 10): 100 parts dimethylhexenylsiloxy-terminated dimethylsiloxane-methylhexenylsiloxane copolymer (viscosity =800 centipoise, hexenyl group content =2.6 mole%), 5 parts trimethylsiloxy-terminated methylhydrogenpolysiloxane (viscosity =20 centipoise), 20 parts silanol-terminated dimethylpolysiloxane (viscosity =12,000 centipoise), 0.7 parts 3-methyl-1-butyne-3-ol, and chloroplatinic acid/tetramethyldivinyls complex at 120 ppm as platinum.

Another organopolysiloxane composition (sample 11) was prepared as above, but changing the blending quantity of the dimethylpolysiloxane in sample 10 to 40 parts.

For comparison, an organopolysiloxane composition (comparison 8) was prepared as above, but changing the blending quantity of the dimethylpolysiloxane in sample 10 to 1 part. An organopolysiloxane composition (comparison 9) was also prepared by similarly changing the blending quantity of the dimethylpolysiloxane to 150 parts. Finally, an organopolysiloxane composition (comparison 10) was prepared as above, but using a dimethylvinylsiloxy-terminated dimethylsiloxane-methylvinylsiloxane copolymer (viscosity = 800 centipoise, vinyl group content = 2.6 mole%) in place of the dimethylsiloxane-methylhexenylsiloxane copolymer of sample 10.

The compositions thus obtained were respectively coated at 0.9 g/m² on mirror-finished polyethylene-laminated kraft paper. The curing index at 90 degrees Centigrade was measured, as were the peeling resistance and residual adhesion on the cured films obtained by heating at 90 degrees Centigrad for 20 seconds. These results are reported in Table 5.

The pot life of the compositions was excellent in each case: almost no increase in viscosity was observed after 1 day.

TABLE 5

| Composition | Curing time at 90° C. (seconds) | Peeling resistance, g/5 cm. | | | | Residual adhesion (%) |
|---|---|---|---|---|---|---|
| | | BPS 5127 | | BPS 2411 | | |
| | | 1 day | 10 days | 1 day | 10 days | |
| sample 10 | 14 | 17 | 19 | 16 | 18 | 94 |
| sample 11 | 16 | 14 | 15 | 13 | 12 | 93 |
| comparison 8 | 14 | 25 | 28 | 29 | 28 | 96 |
| comparison 9 | 21 | 11 | 10 | 10 | 14 | 42 |
| comparison 10 | 64 | 24 | 79 | 81 | 147 | 33 |

EFFECTS OF THE INVENTION

The present invention's release film-forming organopolysiloxane composition is characterized by a rapid curing rate at low temperatures no higher than 100 degrees Centigrade and by the development upon curing of a release film having particularly good release properties.

That which is claimed is:

1. An organopolysiloxane composition for the formation of a release film, said composition consisting essentially of
   (A) 100 weight parts organopolysiloxane which contains in each molecule at least two higher alkenyl groups as represented by the general formula $$H_2C=CH(CH_2-)_a$$

wherein the subscript a has a value of from 2 to 8,
   (B) 0.3 to 40 weight parts organohydrogenpolysiloxane having at least two silicon-bonded hydrogen atoms in each molecule,
   (C) 4 to 100 weight parts organopolysiloxane having the average formula $R^1_d SiO_{(4-d)/2}$ whose molecule may contain small quantities of the hydroxyl group or alkoxy groups but does not contain silicon-bonded alkenyl groups or silicon-bonded hydrogen atoms, wherein $R^1$ is a substituted or unsubstituted monovalent hydrocarbon group free of an alkenyl moiety and the subscript d has a vaule of from 1.95 to 2.05,
   (D) addition-reaction inhibitor in an effective amount, and
   (E) a platinum group metal-containing compound in a catalytic quantity.

2. An organopolysiloxane composition according to claim 1 wherein the value of the subscript a is 3 to 8, both inclusive.

3. An organopolysiloxane composition according to claim 2 wherein the component (A) has a plasticity number of at least 100 and component (C) has a viscosity of at least 1,000 centipoise at 25° C.

4. An organopolysiloxane composition according to claim 3 wherein at least 70mole% of the organic groups of component (A) and of component (C) are the methyl group.

5. An organopolysiloxane composition according to claim 4 wherein component (B) is a trimethylsiloxy-terminated metnylhydrogenpolysiloxane and component (E) is a chloroplatinic acid/divinyltetramethyldisiloxane complex.

6. An organopolysiloxane composition according to claim 5 wherein component (A) is a triorganosiloxy-terminated organopolysiloxane gum.

7. An organopolysiloxane composition according to claim 5 wherein component (A) is a silanol-terminated organopolysiloxane gum.

8. An organopolysiloxane composition according to claim 5 wherein component (C) is a triorganosiloxy-terminated organopolysiloxane.

9. An organopolysiloxane composition according to claim 5 wherein component (C) is a silanol-terminated organopolysiloxane.

* * * * *